Sept. 1, 1931.　　　　J. J. WHARAM　　　　1,821,130
LOCK
Filed Sept. 3, 1929　　2 Sheets-Sheet 1

INVENTOR.
John J. Wharam,
BY
ATTORNEY.

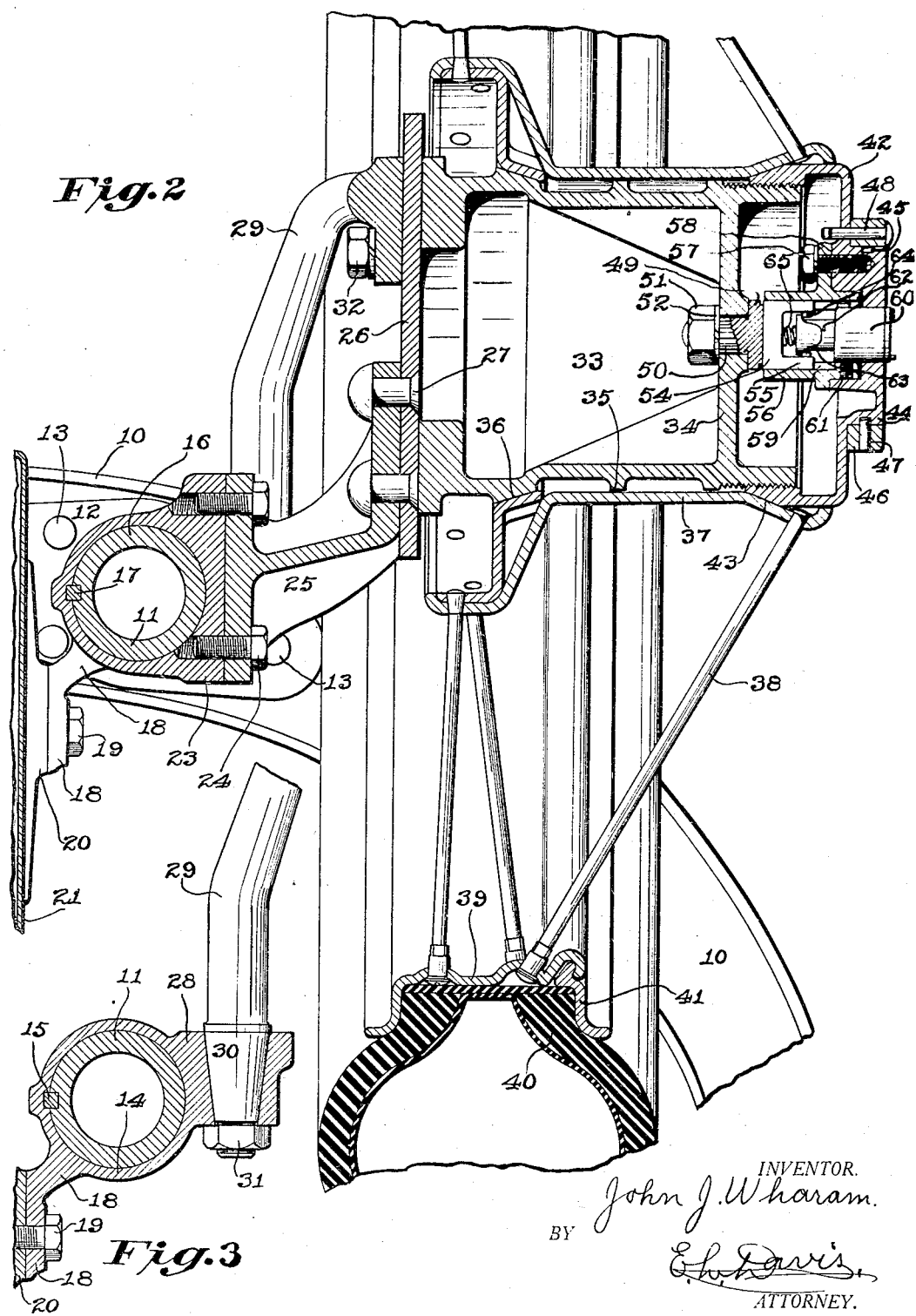

Patented Sept. 1, 1931

1,821,130

UNITED STATES PATENT OFFICE

JOHN J. WHARAM, OF DETROIT, MICHIGAN, ASSIGNOR TO FORD MOTOR COMPANY, OF DEARBORN, MICHIGAN, A CORPORATION OF DELAWARE

LOCK

Application filed September 3, 1929. Serial No. 389,895.

The object of my invention is to provide a lock of simple, durable and inexpensive construction.

Still a further object of my invention is to provide a lock which is particularly adapted for use in holding on spare wire wheels on the wheel carriers for automobiles and other vehicles.

Still a further object of my invention is to provide a lock which is particularly adapted for use in guarding the nut which locks the spare wire wheel in place from tampering.

Still a further object of my invention is to provide a lock in connection with such a nut which will lock the nut from rotation but which will prevent the application of a force to the squared shoulders of the nut sufficient to break the locking mechanism.

Still a further object of my invention is to provide in connection with such a spare wheel locking nut, a ring which is rotatably but non-slidably mounted on the nut and which has the hexagonal faces thereon designed to be engaged by the wrench for unscrewing the nut and to normally lock the ring from rotation relative to the nut by a shear pin which will break when too much force is applied to the nut.

With these and other objects in view, my invention consists in the arrangement, construction and combination of the various parts of my improved device as described in the specification, claimed in my claim and illustrated in the accompanying drawings, in which:

Figure 2 shows a vertical, central, transverse sectional view through the wheel illustrating the construction of the improved lock nut used in connection therewith.

Figure 1:
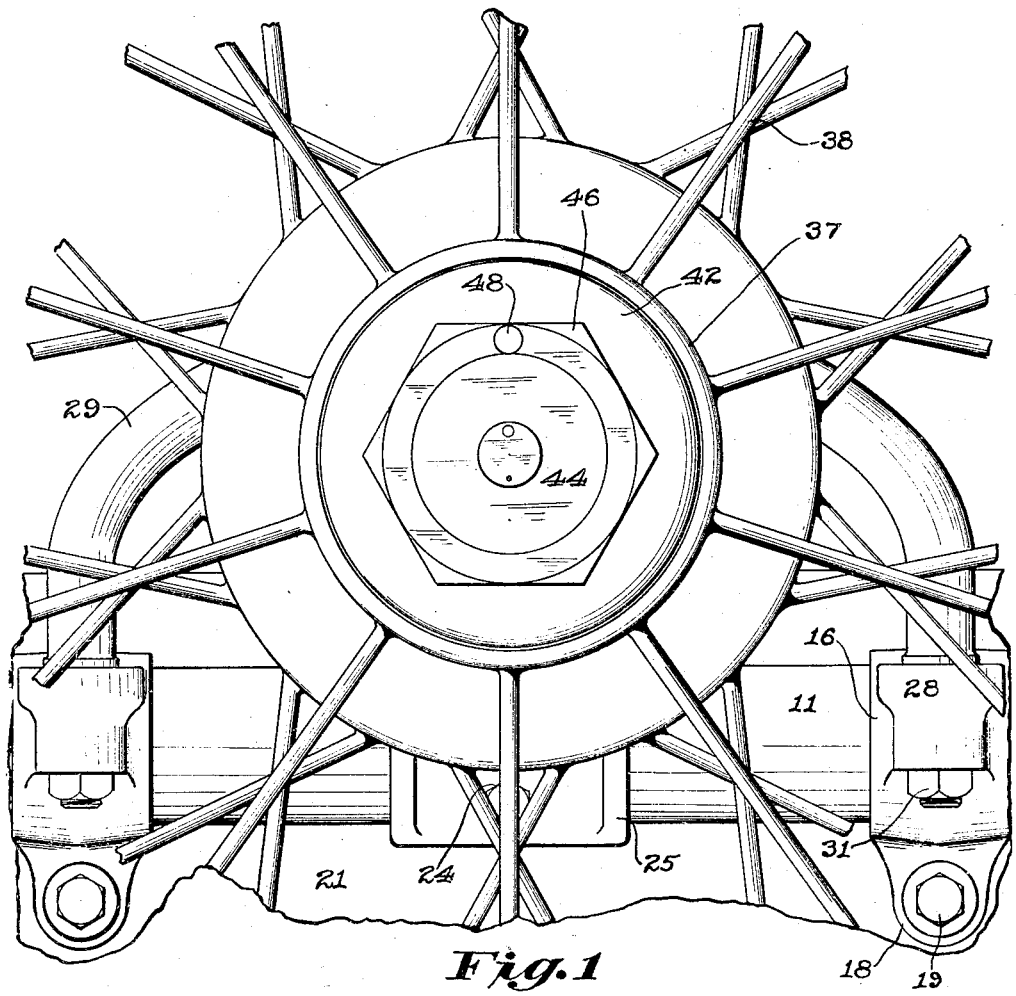
Figure 1 shows a front elevation of a wheel and locking nut therefor together with part of the supporting structure for the spare wheel.
Figure 4:
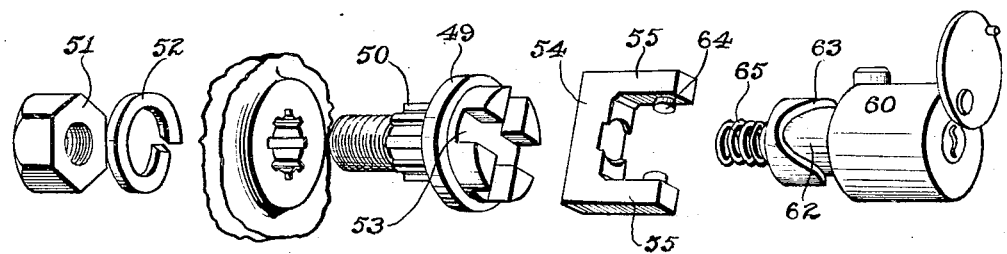

Figure 3 shows a vertical sectional view illustrating the manner of attaching the spare wheel bracket arm to a frame cross member, and Figure 4 shows an enlarged detailed view of the locking mechanism, the parts being shown in perspective and in the order in which they are assembled together so as to illustrate the construction of the individual parts of the lock and their relation in their assembled position together with the manner of assembly.

It will be understood that this device is shown as being used in connection with a spare wheel mounted on the rear end of an automobile frame but that the wheel may be mounted in any desired place on the machine. In these drawings, I have used the reference numeral 10 to indicate the side frame member of an automobile. There is a tubular cross frame member 11 secured to the frame member 10 in any suitable manner, as for instance, by the flange 12 and rivets 13. A sleeve 14 is forced on over each end of the cross member 11 and a key 15 prevents rotation of the sleeve relative to the frame member 11. Adjacent to the center of this frame member 11 is another sleeve 16 which is also forced on over the cross member to position about the center thereof and a key 17 is used to prevent rotation of the sleeve 16. The sleeves 14 have lugs 18 preferably formed integral therewith and these lugs 18 are connected by screws 19 with bosses 20 which are welded or brazed to the rear wall of a gas tank 21. These sleeves 14 and 16 are forced on over the cross member 11 under pressure so that they are really held from rotation by the frictional engagement with the cross member 11 while the keys 15 and 17 are used as an added precaution. The lugs 18 further prevent movement of the sleeves 14 and also serve as a support for the gas tank.

The rear portion of the sleeve 16 is provided with an enlarged boss 23 designed to receive the machine screws 24. A supporting arm 25 is attached to the boss 23 by the screws 24. This supporting arm 25 is of angular section and extends in a rearward direction to a position to support a circular plate 26 through the rivets 27.

The sleeves 14 have ears 28 extended rearwardly therefrom which have tapered openings extending vertically therethrough. Supporting arms 29 have tapered ends 30 which are seated in the tapered sockets in the ears 28 and held in position therein by the nuts 31. These arms 29 extend upwardly and then laterally towards each other to position adjacent to the top of the circular plate 26, where they are held in place by the screws 32. Secured to the forward face of the base plate 26 in any suitable manner is a tubular supporting member 33. This supporting member may be secured on in any suitable way but it is preferred to weld or braze it in place. A partition 34 extends across the inside of this tubular member 33, this partition having a central opening therein and being spaced forwardly somewhat from the rear end of the tube 33. The exterior of this tube is ribbed at 35 and tapered at 36 to provide a suitable seat for the hub 37 of the spare wheel. This wheel has the spoke 38, the rim 39, the tire 40, and the tire locking ring 41. The exterior of the tubular member 33 is threaded at its rear end to co-act with a locking nut 42 which is designed to lock the wheel to the wheel carrier. This nut has a tapered face 43 which co-acts with a correspondingly tapered portion on the hub 37 to force the hub to seat on the tapered portion 36 and to properly center the wheel on the wheel carrier and to hold it in such position. This nut has a thread co-acting with the thread on the exterior of the rear end of the tubular member 33.

It will readily be seen that if the nut 42 is provided with an ordinary hexagonal or other angular shaped portion designed to co-act with a wrench for the purpose of unscrewing the nut to remove the wheel, then means must be provided to lock the nut onto the tire or else the wheel may be removed by any unauthorized person having a suitable wrench. In the past attempts have been made to provide a locking device in or about the nut which would prevent rotation thereof by unauthorized persons but such locking devices were intended to lock the nut to the spare wheel carrier and a person with a sufficiently large wrench could press hard enough on the nut to spoil these locking devices and force the nut off in spite of them. It is the object of this invention to provide means so that a person attempting to remove the nut without unlocking the nut will do no particular damage to the nut or lock and will not prevent subsequent removal thereof by a person having a key to the lock.

This difficulty in the locking of the spare wheel nut has been solved in this construction by mounting the portion of the nut which has the hexagonal or angular faces for engaging the wrench so that it may rotate freely on the remaining portion of the nut and then providing a suitable locking device between said wrench engaging portion and the nut whereby an undue force applied to the wrench engaging portion will shear the locking device off without rotating the nut. Means are also provided for locking the nut so that it will not rotate when the locking means are in their latched position.

The central rear face of the nut 42 has a circular boss 44 extending therefrom which is provided with an annular groove 45. A ring 46 which is provided with hexagonal faces is rotatably mounted on this boss 44 and one or more pins 47 are extended through this ring and into the groove 45 to permit the rotary movement of the ring on the nut but to prevent axial movement of these two members relative to each other. A shear pin 48 is extended through the ring 46 and into the body of the nut 42 to normally hold these two parts from rotation relative to each other. If, however, it is attempted to forcibly rotate the nut 42 by means of the ring 46 when the locking device is locked then the pin 48 will shear before the force applied can be great enough to damage the locking mechanism. It will be noted that if an unauthorized person should shear off the pin 48 then the owner of the vehicle may still remove the nut 42 by unlocking the nut in the normal way and then inserting any rather small metallic pin in place of the damaged pin 48.

A lock anchoring member 49 is extended through the partition 34 and is held from rotary movement relative to the partition by the splines 50 and from axial movement through the partition by the nut 51 and which is locked in place by the lock washer 52. The rear portion of this anchoring member has a pair of intersecting perpendicular channels 53 cut in the rear face thereof which are adapted to co-act with the central portion 54 of a U shaped locking jaw which has arms 55 thereon. A sleeve 56 is anchored to the rear face of the central portion of the nut 42 by the screws 57 which extend through a flange 58 which is formed integral with the sleeve 56. This sleeve 56 has the splines 59 therein which receive the arms 55 of the locking dog member and hold the latter from rotation relative to the nut 42. From the foregoing it will be seen that if the locking member 54 is slid into the channel 53 then the nut 42 will be held from rotation relative to the partition 44 and consequently the spare wheel carrier. This would mean that the nut 42 cannot be rotated when the locking member 54 is in engagement with the channel 53 and consequently the nut cannot be unscrewed when the parts are in the locked position.

For reciprocating the locking member 54 in the sleeve 56, means are provided which may be operated by a key. A cylinder lock 60 is fixed to the central portion of the nut in any suitable manner as by being wedged into the sleeve 56 by means of the set screw 61. The key which operates this lock serves to rotate the stem 62. This stem has a double cam face 63 formed thereon, the face of this cam being disposed in radial lines relative to the stem 62. Lugs 64 are formed integral with the arms 55 and extend inwardly therefrom, these lugs being so placed that the arms 55 may be forced to embrace the stem 62 and the lugs 64 so as to engage the cam surfaces 63. A compressible coil spring 65 is disposed between the locking member 64 and the end of the stem 62 whereby the lugs 64 are yieldingly held into engagement with the cam 63.

Due to the shape of the cam 63 and the action of the springs 65, it will be seen that rotation of the stem 62 will cause reciprocation of the locking member 54. When it is desired to unlock the nut 42, the stem 62 is rotated to position to draw the lugs 64 up on to the rearmost portion of the cam 63 which will draw the locking member 54 up toward the rear thereby pulling it out of engagement with the channels 53. This will place the spring 65 under some compression. When the parts are in this position it will be seen that the angular faces on the ring 46 may be engaged by the wrench and the nut rotated to unscrew it to permit removal of the wheel or to screw it up to lock the wheel in place on the spare wheel carrier. If, however, the stem 62 be again rotated by means of the key to position to permit the lugs 64 to slide forwardly due to the pressure of the spring 65, then the locking member 54 will be pushed forward by the same spring pressure and tend to enter one of the channels 53.

It will be noted that the locking member does not necessarily enter one of the channels 53 when the lock is placed in the locking position because the nut may not be in just the proper position to cause this engagement. If, however, any person should rotate the nut when the parts are in locked position, then it will be seen that the member 54 will be turned to position to engage one of the channels 53 when the nut has been turned less than a quarter of a turn and the locking members are then engaged to prevent further rotation of the nut 42. If the person attempting to turn the nut 42 applies anything like enough pressure to injure the locking parts of the nut and lock, then the shear pin 48 will shear off and permit the ring 46 to rotate freely on the nut 42 so that no further damage can be done to the nut or the locking mechanism therefor. It will be noted that the nut is so fashioned that it is largely received within the hub 37 so that it is practically impossible to get any kind of a wrench onto the nut except on the ring 46.

The advantages of my improved device have been pointed out more or less in the course of the specification but it should be specially pointed out that with this device, the only damage done by unauthorized tampering with the spare wheel is the breaking of a shear pin of nominal value and which can be readily replaced.

Some changes may be made in the arrangement, construction and combination of the various parts of my improved device without departing from the spirit of my invention and it is my intention to cover by my claim such changes as may reasonably be included within the scope thereof.

I claim as my invention:

In a lock, a hub supporting member, a hub securing nut threaded on said member, an annular groove in said nut, a wrench ring rotatably mounted on the nut enclosing said groove, a shear pin normally holding the wrench ring from rotation relative to the nut, and a retaining pin extending from said ring into said groove permitting rotary movement and preventing axial movement of the nut relative to the wrench ring, and means for locking said nut from rotation relative to said hub supporting member.

August 26, 1929.

JOHN J. WHARAM.